Oct. 31, 1939.  L. T. SACHTLEBEN  2,178,243
FILM FEEDING DEVICE
Filed July 22, 1936  2 Sheets-Sheet 1
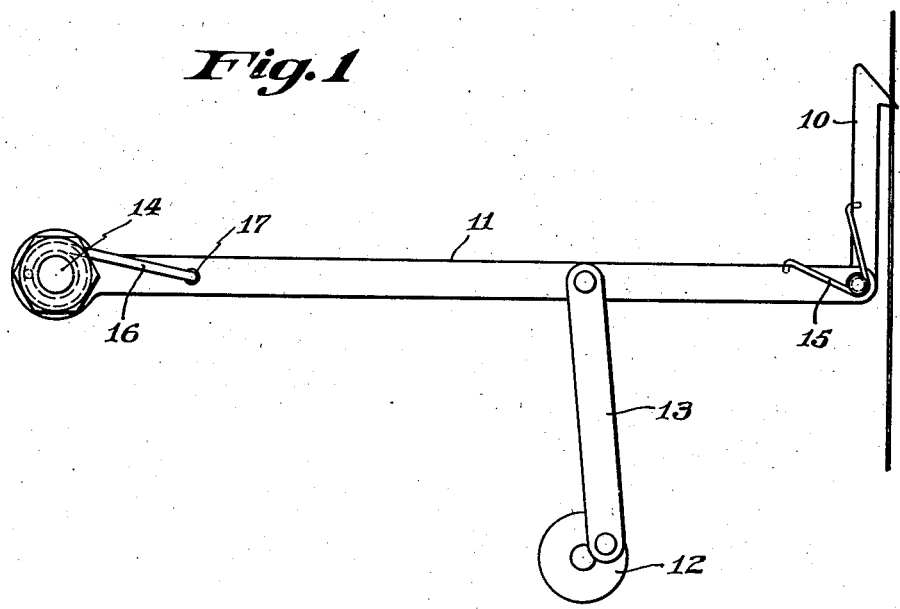
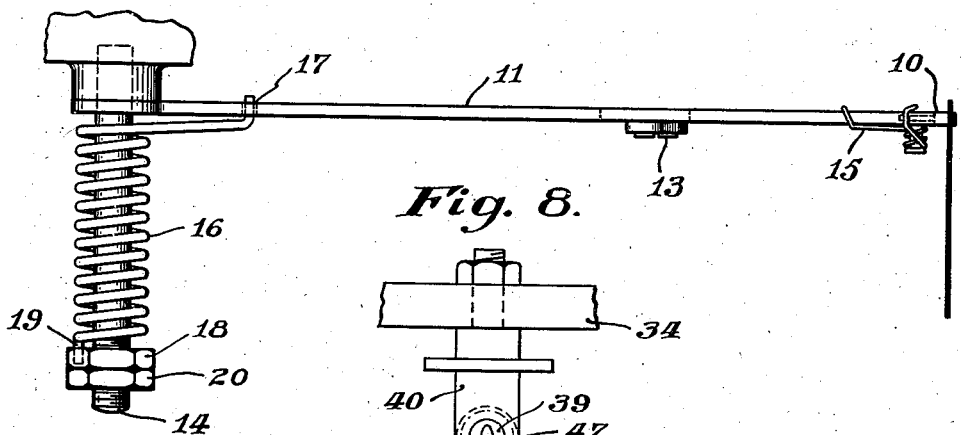
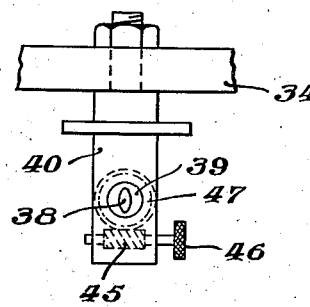
INVENTOR
LAWRENCE T. SACHTLEBEN
BY
ATTORNEY Oct. 31, 1939.　　L. T. SACHTLEBEN　　2,178,243
FILM FEEDING DEVICE
Filed July 22, 1936　　2 Sheets-Sheet 2
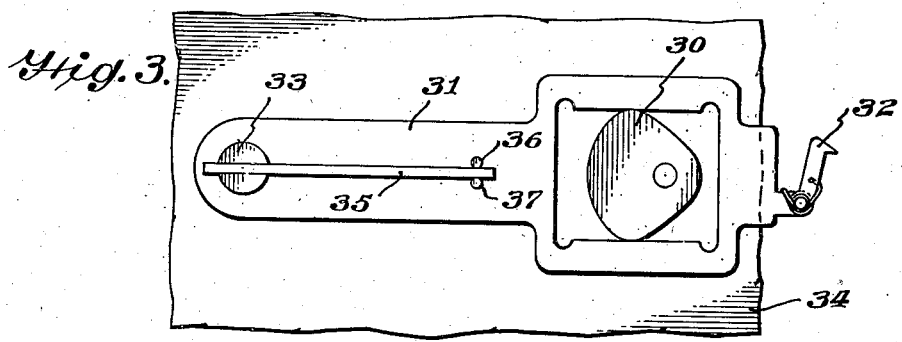
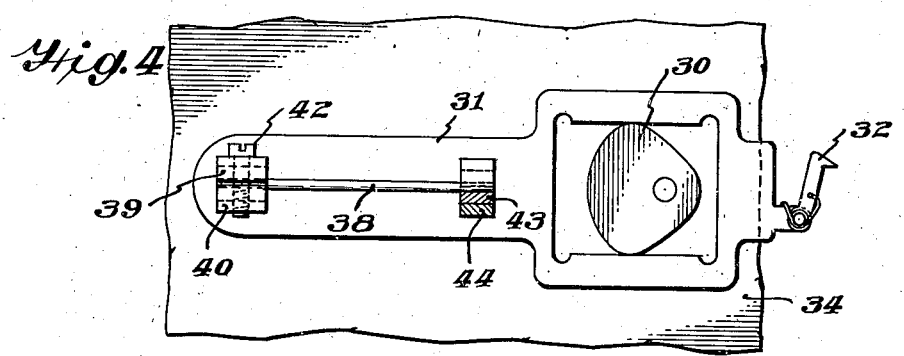
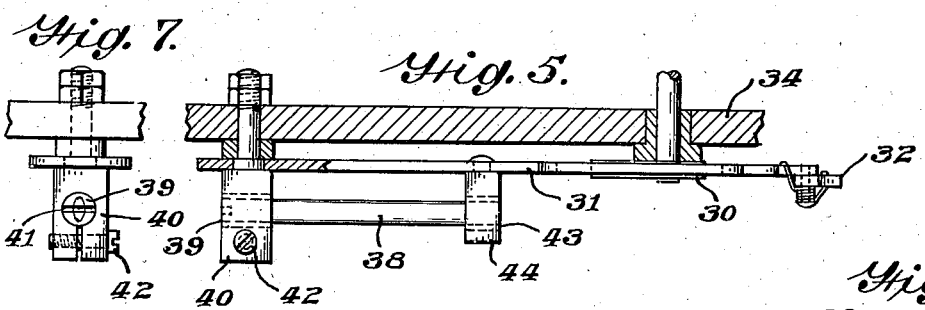
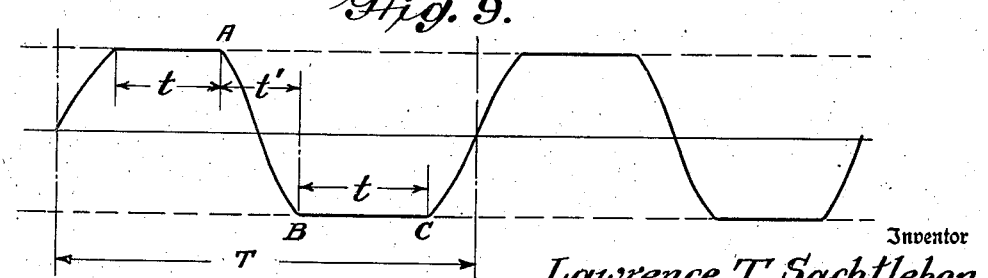
Inventor
Lawrence T. Sachtleben,
By
Attorney Patented Oct. 31, 1939

2,178,243

UNITED STATES PATENT OFFICE 2,178,243

FILM FEEDING DEVICE

Lawrence T. Sachtleben, Camden, N. J., assignor to Radio Corporation of America, a corporation of Delaware Application July 22, 1936, Serial No. 91,919

3 Claims. (Cl. 88—18.4)

This invention relates to mechanisms for moving motion picture film and more specifically to an intermittent film feed mechanism of the intermittent grip type.

Heretofore it has been customary in this type of feeding device to actuate the feed claw by means of a pivoted arm which in turn is operated by a crank or cam at the desired speed. In the operation of such devices considerable vibration is likely to be produced. The present invention has for its purpose to reduce both the power required by and the vibration imparted to the camera or projector. It involves tuning the vibrating arm by appropriate means so that the natural period of vibration of the system including the claw and arm is the same as the rate of feed of the film in frames per second.

One object of the invention is to provide an intermittent feed mechanism which is relatively free from vibration of the camera or projector.

Another object of the invention is to provide such a feed mechanism which is simple and compact.

Another object of the invention is to provide such a feed mechanism which requires a minimum of power to actuate.

Other and incidental objects of the invention will be apparent to those skilled in the art from the reading of the following specification and an inspection of the accompanying drawings in which, Figure 1 is a side view of one form of my intermittent feed mechanism, Figure 2 is a top view of the device of Fig. 1, Figure 3 is a side view of a second form of my invention, Figure 4 is a side view of a third form of my invention which is a modification of the form shown in Fig. 3, Figure 5 is a longitudinal section through the mechanism of Fig. 4, Figure 6 is a transverse section through the spring of the form of device shown in Figs. 4 and 5, Figure 7 is an elevation from the left hand end of Figs. 4 and 5, Figure 8 is a view of a modified form of the construction shown in Fig. 7, and Figure 9 is a curve of movement of the intermittent arm plotted against time showing manner in which the apparatus operates.

The form of the invention illustrated by Fig. 1 includes the usual feed claw 10 which is carried upon the movable arm 11 and driven by the crank 12 through the link 13. The arm 11 is pivoted upon the shaft 14. The claw 10 is pressed toward the film by the spring 15 which co-acts with both the claw 10 and the arm 11.

As shown in Figure 2, there is provided a spring 16 one end of which passes through a hole in the arm 11 at 17 and the other end of which is secured in the nut 18 as indicated at 19. This spring 16 is free to rotate about the shaft 14 in accordance with the movements of the arm 11. The nut 18 is provided with an appropriate lock nut 20 for securing it in position.

The spring 16 is made of such length and thickness in relation to the masses of the members 10 and 11 as to give to the system 10, 11, 16 a period of vibration corresponding to the rate of film feed. For example, for sound picture work the system would be tuned to 24 vibrations per second. In order to adjust the spring to the proper neutral position when at rest the nut 18 is turned thereby adjusting the position of the spring about the shaft 14 and this nut is then secured in position by tightening the nut 20 thereagainst.

It will be apparent that in making this adjustment a number of factors must be considered. For example, the weight of the arm 11 must be more than counter-balanced at its lowermost position while the power required for driving the film must be exerted in a downward direction. To secure the proper relation between these various factors the arm 11 is disconnected from the crank 12 and adjusted approximately to the middle of its stroke by means of the spring 16. The elasticity of the spring 16 must be such as to ensure synchronism between the natural period of the intermittent and the movement of the film. This requires care in the selection of a spring or the use of an adjustable elasticity spring such as that hereinafter described. The periodicity of the intermittent may also be adjusted by changing the weight of the arm.

In the form of the invention shown in Fig. 3, a triangular cam 30 is used to oscillate an arm 31 which is provided with a claw 32 and is pivoted to a shaft 33 fixed to the plate 34.

Into a slot in this pin 33 is fixed a spring 35 which may be of ordinary flat spring steel or bronze. Pins 36 and 37 may be fixed in the arm 31 at such a distance from each other as to provide a sliding fit, if desired, for the spring 35. It will be apparent that as the arm 31 is moved up or down from its midposition shown, the spring 35 will be flexed in one direction or the other and will slide between the pins 36 and 37, thereby operating as previously described.

In the form of the invention shown in Fig. 4, a spring 38 having an oval-shaped cross section as shown in Fig. 6 is used in place of the flat spring 35 of Fig. 3. This oval spring is provided at each end with a circular portion as shown in more detail at 39 in Fig. 7. This circular portion may be cast or otherwise fixed to the end of the spring 38 or may be formed out of the same piece of material. The left hand circular end 39 is secured in a stationary post 40, is rotatable therein by means of the screw driver slot 41, and is clamped in position in the split post 40 by the screw 42. The other circular end 43 of the spring 38 is arranged to slide in the circular hole in the post 44 which is fixed to the arm 31. By rotation of the spring in the support 40, the elastic coupling between the fixed support and the arm is readily adjusted to any desired value.

It will be apparent that in the form of the device shown in Figs. 3, 4 and 5, when in operation at the middle of the stroke and moving either up or down, the velocity of either the arm or claw will be at a maximum, and when at the top or bottom of the stroke where the claw engages or disengages the perforations of the film the arm and claw are at rest. The displacement curve of the intermittent during two cycles of its motion is shown in Fig. 9.

The motion is periodic, the period T including a time $t'$, during which the intermittent moves from one extreme position to the other, and a period $t$ when no movement occurs.

Since in sinusoidal motion, a mass and associated compliance constitute a closed system of constant energy by moving between two states of rest such that half way between the states of rest all of the energy resides in the moving mass, while at the moment a state of rest is attained the energy resides in the strained compliance, it is seen that the status of the device as a closed system of constant energy is not altered by prolonging the state of rest for any desired length of time, since once the mass is at rest the compliance will as readily give up its energy by accelerating the mass an hour later as by accelerating the mass immediately after the state of rest has been attained.

A system moving sinusoidally but with prolonged periods of zero velocity caused by a stop acting on it at the instant the condition of rest is attained will be constant in energy and will approximate the motion of the intermittent mechanism above described.

In the type of intermittent under consideration without my improvement therein, if the maximum angular velocity is $\omega$ and its moment of inertia is I, then during every cycle of its motion an amount of energy $E = I\omega^2$ must be supplied to the moving system by the driving mechanism or cam 30 in order that the movement may attain the velocity $\omega$, because as the system comes to rest at the end of each stroke all this energy is dissipated as heat and noise and none of it is stored to be returned to the mass during the following stroke. Thus the energy supplied the intermittent during each cycle is equal to the energy required to move the film, plus the frictional losses in the intermittent mechanism, plus the kinetic energy of the intermittent mechanism, $I\omega^2$.

It will be apparent that in the forms of invention shown in Figs. 3 to 8, the energy is stored in the spring 35 or 38 during the period the cam 30 maintains the arm in its uppermost or lowermost stationary position.

If the angular amplitude of the arm's motion is $\theta_1$, and the restoring torque due to the action of the spring is $T = f(\theta)$, then the energy stored in the spring at the end of each stroke will equal the kinetic energy of the arm in the middle of the stroke when $$\int_0^{\theta_1} f(\theta) d\theta = \frac{1}{2} I \omega^2$$

and if $f(\theta) = k\theta$, which it will to a first approximation $$\int_0^{\theta_1} k\theta d\theta = [\frac{1}{2} k\theta_1^2 = \frac{1}{2} I\omega^2$$

Another way of locking at it is that if the displacement AB is assumed sinusoidal, the system must be tuned to resonate at the period $T - 2t = 2t'$ or the frequency $$\frac{1}{2t'} = \frac{1}{T - 2t}$$

In order to comply with the foregoing conditions under any conditions to which the machine may be subjected, the adjustable mechanism shown in Figs. 4 to 8 is provided. In this form of the invention the spring 38 is made sufficiently thin in its least cross section to cause a proper period of oscillation of the system at the lowest speed at which the intermittent may be required to run or even at a slightly lower speed. On the other hand, the greatest cross section of the spring 38 is made sufficiently great to give a shorter period of oscillation than that at the highest speed at which the intermittent may be required to run. For example, if the intermittent is to be used in a 16 mm. projector where the movement thereof is relatively small and where for silent pictures a projection rate is 16 frames per second is used, the smaller dimension of the spring 38 will be quite small, while if the mechanism were used in a 35 mm. projector to actuate the relatively heavy mechanism at a speed of 24 frames a second for use in sound pictures, the minimum dimension of the spring 38 would be considerably larger. The larger dimension of the spring 38 should be sufficiently great to provide a natural period of not less than 24 frames a second and in some instances a period of as much as 48 or 96 vibrations per second may be necessary.

In adjusting the apparatus for the particular conditions under which it is to operate, the intermittent feed is run at the intended speed, screw 42 slightly loosened, and spring 38 rotated in the member 40 until it is in tune with the operating frequency. This may be readily determined by the noticeable reduction in noise and in vibration of the apparatus when the intermittent is tuned to the periodicity of film movement.

When it is desired to vary the adjustment of the apparatus while operating, as for example when changing from 16 frames per second silent pictures to 24 frames per second sound pictures in the same reel, the adjusting mechanism for the spring 38 may be constructed as shown in Fig. 8. In this case a screw 45 is provided adapted to be actuated by the knurled head 46. This screw is fitted into appropriate recess in the post 40 and coacts with a worm wheel 47 which is secured to the member 39 on the spring 38. It will be apparent that rotation of the screw 45 in one direction or the other will rotate the spring 38 and thereby effect the tuning adjustment above described.

Having now described my invention, I claim:
1. Intermittent feed mechanism comprising a film engaging claw, an arm carrying said claw, means for driving said arm, spring engaging means on said arm, a stationary spring engaging means, a spring of oval cross section secured in said stationary means and engaging said spring engaging means for giving said arm a natural period of vibration, and means for rotating said spring for adjusting said natural period of vibration.

2. An intermittent feed mechanism comprising a film engaging member, a reciprocable member fixedly pivoted at one of its ends and mechanically coupled to said film engaging member at the other of its ends, driving means for reciprocating said reciprocable member, and a spring fixed adjacent said pivot and connected to said member at a point spaced from the pivot arranged to apply to said reciprocable member an elastic force so related to the masses of said film engaging and reciprocable members that said mechanism has a natural vibration period of the same frequency as that at which said reciprocable member is reciprocated by said driving means.

3. An intermittent feed mechanism including a film engaging member, a reciprocable member fixedly pivoted at one of its ends and mechanically coupled to said film engaging member at the other of its ends, driving means for reciprocating said reciprocable member, and a spring fixed to a stationary support at one of its ends at said pivot and having its other end slidably engaging said reciprocable member at an intermediate point, the elasticity of said spring being so related to the masses of said film engaging and reciprocable members that said mechanism has a natural vibration period of the same frequency as that at which said reciprocable member is reciprocated by said driving member.

LAWRENCE T. SACHTLEBEN.